(12) United States Patent
Girard et al.

(10) Patent No.: US 9,266,434 B2
(45) Date of Patent: Feb. 23, 2016

(54) MODULAR BATTERY DISCONNECT UNIT

(71) Applicants: Robert Bosch GmbH, Stuttgart (DE); Samsung SDI Co., Ltd., Yongin-si, Gyeonggi-do (KR)

(72) Inventors: Gregory J. Girard, Grand Blanc, MI (US); Pat Whalen, Chesterfield Township, MI (US)

(73) Assignee: Robert Bosch GmbH, Stuttgart (DE)

( * ) Notice: Subject to any disclaimer, the term of this patent is extended or adjusted under 35 U.S.C. 154(b) by 597 days.

(21) Appl. No.: 13/655,781

(22) Filed: Oct. 19, 2012

(65) Prior Publication Data
US 2013/0099765 A1    Apr. 25, 2013

Related U.S. Application Data

(60) Provisional application No. 61/550,063, filed on Oct. 21, 2011.

(51) Int. Cl.
| | |
|---|---|
| *G05F 1/46* | (2006.01) |
| *B60L 3/00* | (2006.01) |
| *B60L 3/04* | (2006.01) |
| *B60L 11/18* | (2006.01) |
| *H02J 7/00* | (2006.01) |

(52) U.S. Cl.
CPC ............. *B60L 3/0046* (2013.01); *B60L 3/0092* (2013.01); *B60L 3/04* (2013.01); *B60L 11/1879* (2013.01); *H02J 7/0031* (2013.01); *B60L 2270/40* (2013.01); *Y02T 10/705* (2013.01); *Y02T 10/7005* (2013.01)

(58) Field of Classification Search
CPC ..... B60L 3/0046; B60L 11/1879; B60L 3/04; H02J 7/0031; Y02T 10/7005; Y02T 10/705
See application file for complete search history.

(56) References Cited

U.S. PATENT DOCUMENTS

| | | |
|---|---|---|
| 6,797,018 B2 | 9/2004 | Rouillard et al. |
| 6,882,129 B2 | 4/2005 | Boskovitch et al. |
| 7,164,272 B1 | 1/2007 | Borrego Bel et al. |

(Continued)

FOREIGN PATENT DOCUMENTS

DE    10 2009 019 531 A1    12/2009

OTHER PUBLICATIONS

International Search Report and Written Opinion corresponding to PCT Application No. PCT/US2012/061050, mailed Aug. 8, 2013 (11 pages).

*Primary Examiner* — Jared Fureman
*Assistant Examiner* — Emmanuel R Dominique
(74) *Attorney, Agent, or Firm* — Maginot Moore & Beck LLP

(57) ABSTRACT

A system according to the principles of the present disclosure includes a battery disconnect unit (BDU) and a cartridge. The BDU includes a first positive terminal, a first negative terminal, a second positive terminal, a second negative terminal, a first current path, a second current path, a first switch, and a second switch. The first current path is between the first positive terminal and the second positive terminal. The second current path is between the first negative terminal and the second negative terminal. The first switch is disposed in the first current path. The second switch is disposed in the second current path. The cartridge includes a first terminal, a second terminal, and a current path between the first terminal and the second terminal. The first terminal is configured to connect to one of the terminals on the BDU.

20 Claims, 9 Drawing Sheets

(56) References Cited

U.S. PATENT DOCUMENTS

| | | |
|---|---|---|
| 7,471,066 B2 | 12/2008 | Ambrosio et al. |
| 7,511,456 B2 | 3/2009 | Lee et al. |
| 7,589,497 B2 | 9/2009 | Taylor et al. |
| 7,671,565 B2 | 3/2010 | Straubel et al. |
| 7,705,491 B2 | 4/2010 | King et al. |
| 7,943,252 B2 | 5/2011 | Yoon et al. |
| 8,026,698 B2 | 9/2011 | Scheucher |
| 2004/0048142 A1 | 3/2004 | Marusak et al. |
| 2007/0087266 A1 | 4/2007 | Bourke et al. |
| 2007/0093090 A1 | 4/2007 | Fujimaki |
| 2008/0111427 A1* | 5/2008 | Elder ............... B60L 3/0046 307/66 |
| 2009/0208821 A1 | 8/2009 | Kosugi et al. |
| 2009/0212627 A1* | 8/2009 | Sakata ............... H02H 9/001 307/10.7 |
| 2010/0315043 A1* | 12/2010 | Chau ............... B60L 3/0046 320/134 |
| 2011/0039147 A1 | 2/2011 | Cheon et al. |
| 2011/0045343 A1 | 2/2011 | Barkoczi et al. |
| 2011/0070475 A1 | 3/2011 | Thomas et al. |
| 2011/0111649 A1* | 5/2011 | Garascia ............ H01M 2/1077 439/890 |
| 2011/0133546 A1* | 6/2011 | Jang ................. H02M 7/53871 307/9.1 |
| 2011/0189514 A1 | 8/2011 | Lee et al. |
| 2011/0213509 A1 | 9/2011 | Onnerud et al. |
| 2011/0293992 A1* | 12/2011 | Hsu ..................... H01M 2/206 429/152 |
| 2012/0212882 A1* | 8/2012 | Barkoczi ............ B60R 16/0238 361/637 |
| 2012/0253715 A1* | 10/2012 | Ohtomo ............ B60L 11/1816 702/63 |
| 2014/0192457 A1* | 7/2014 | Zhao ................. B60R 16/0238 361/624 |

\* cited by examiner

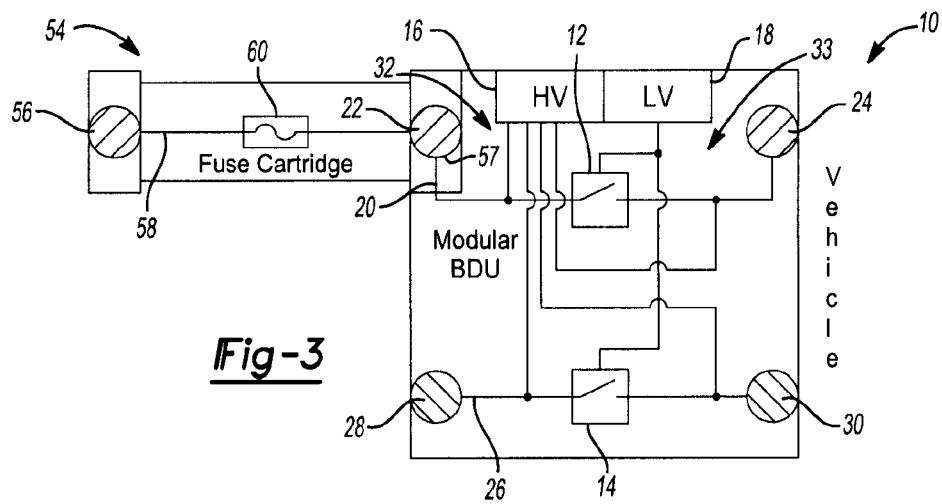
*Fig-3*
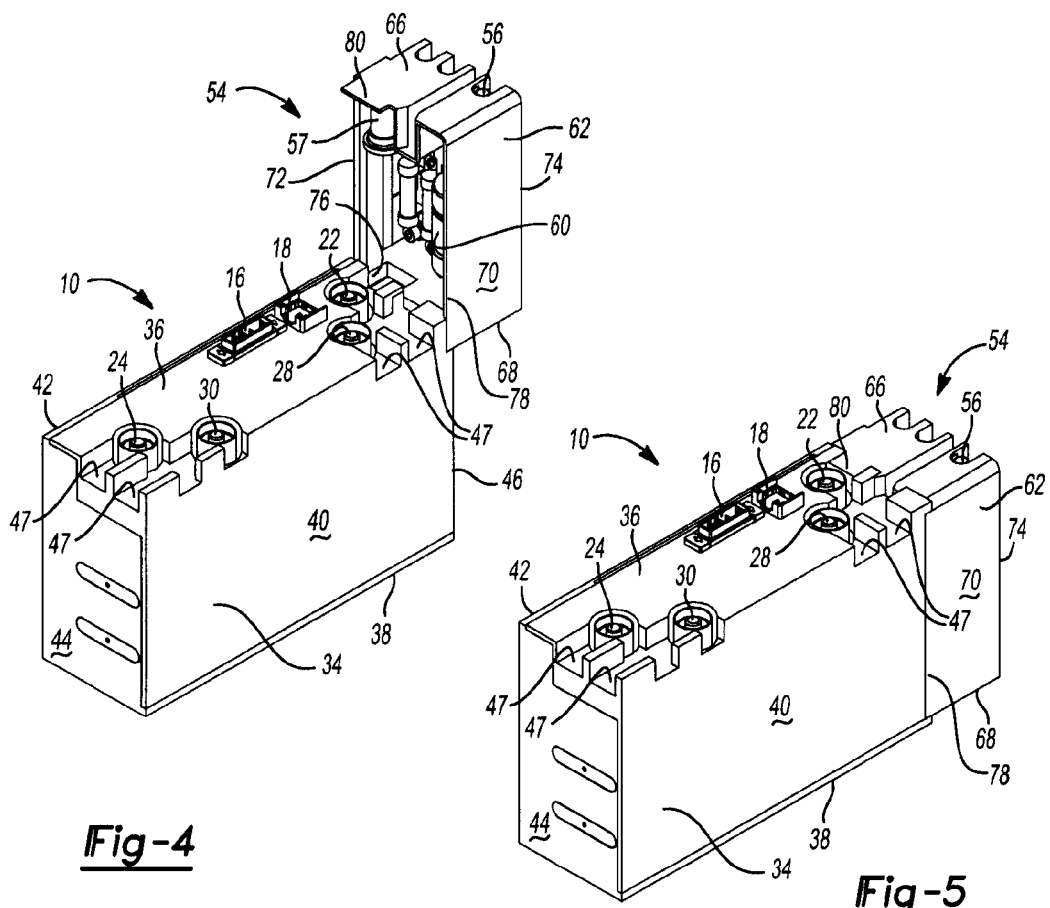
*Fig-4*    *Fig-5*

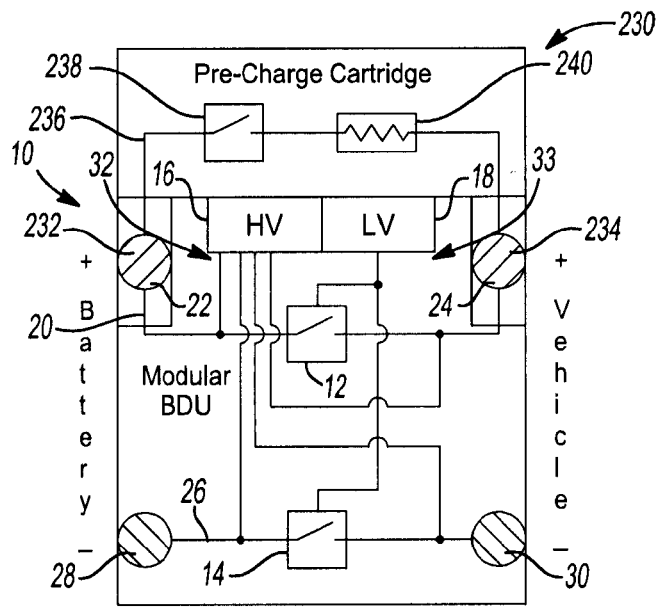
_Fig-15_
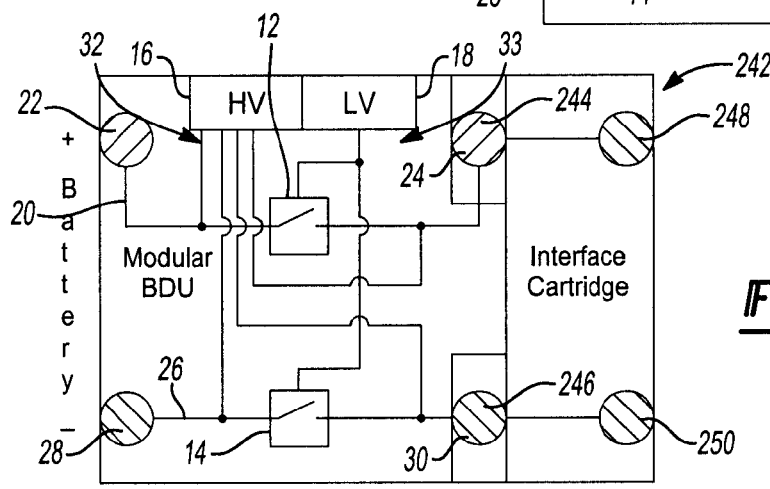
_Fig-16_
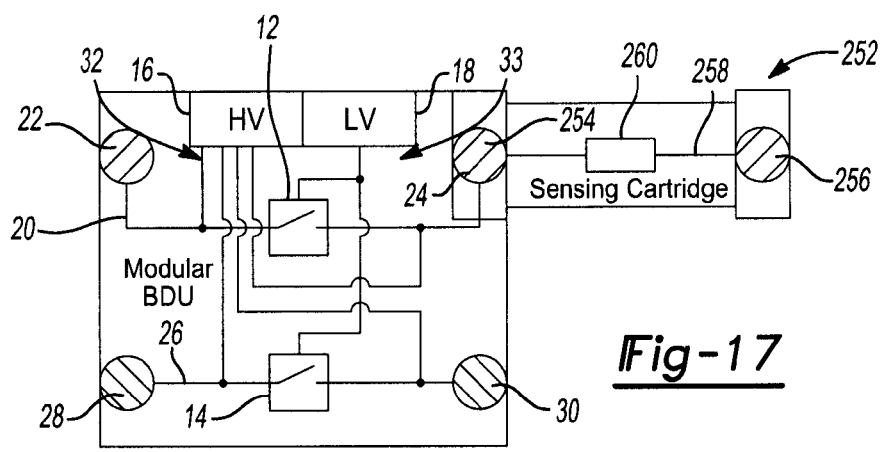
_Fig-17_

MODULAR BATTERY DISCONNECT UNIT

CROSS-REFERENCE TO RELATED APPLICATIONS

This application claims the benefit of U.S. Provisional Application No. 61/550,063, filed on Oct. 21, 2011. The entire disclosure of the above application is incorporated herein by reference.

FIELD

The present disclosure relates to battery management systems for an electric vehicle, and more specifically, to modular battery disconnect units.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric vehicles (EVs), hybrid electric vehicles (HEVs) and plug-in HEVs use one or more propulsion systems to provide motive power. The propulsion systems include an electrical system that receives power from a battery pack. A battery pack typically includes one or more battery modules that each includes a plurality of high-voltage cells (or batteries) such as lithium ion cells. A battery management system controls current flow between the battery pack and the electrical system.

The battery management system includes a battery disconnect unit (BDU) and a battery control unit (BCU). The BDU is the primary interface between the battery pack and the electrical system. The BDU includes electromechanical switches that open or close high current paths between the battery pack and the electrical system. The BDU provides feedback to the BCU such as voltage and current measurements. The BCU controls the switches in the BDU using low current paths based on the feedback received from the BDU.

SUMMARY

This section provides a general summary of the disclosure, and is not a comprehensive disclosure of its full scope or all of its features.

A system according to the principles of the present disclosure includes a battery disconnect unit (BDU) and a cartridge. The BDU includes a first positive terminal, a first negative terminal, a second positive terminal, a second negative terminal, a first current path, a second current path, a first switch, and a second switch. The first current path is between the first positive terminal and the second positive terminal. The second current path is between the first negative terminal and the second negative terminal. The first switch is disposed in the first current path. The second switch is disposed in the second current path. The cartridge includes a first terminal, a second terminal, and a current path between the first terminal and the second terminal. The first terminal is configured to connect to one of the terminals on the BDU.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a schematic diagram of a fuse cartridge according to the principles of the present disclosure connected to the first modular BDU;

FIGS. 4 and 5 are perspective views of the first modular BDU and the fuse cartridge;

FIG. 15 is a schematic diagram of a pre-charge cartridge according to the principles of the present disclosure connected to the first modular BDU;

FIG. 16 is a schematic diagram of a terminal interface cartridge according to the principles of the present disclosure connected to the first modular BDU; and FIG. 17 is a schematic diagram of a current sensing cartridge according to the principles of the present disclosure connected to the first modular BDU.

Corresponding reference numerals indicate corresponding parts throughout the several views of the drawings.

DETAILED DESCRIPTION

Figure 1:
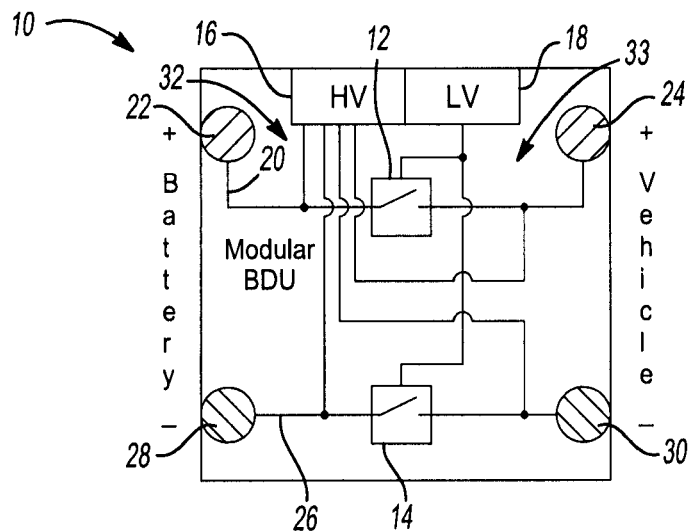
FIG. 1 is a schematic diagram of a first modular battery disconnect unit (BDU) according to the principles of the present disclosure.

Example embodiments will now be described more fully with reference to the accompanying drawings.

As the primary interface between a battery pack and an electrical system of a vehicle, a battery disconnect unit (BDU) typically performs several different functions. These functions include fusing, external charging, pre-charging, terminal interfacing, and current sensing. The BDU performs fusing by interrupting the flow of current between the battery pack and the electrical system when a magnitude of the current, or the duration for which the current is at the magnitude, is greater than a predetermined value. The BDU performs external charging by controlling current flow between the battery pack and a charger on the vehicle that is configured to connect to a power source outside of the vehicle such as an electric vehicle (EV) charging station.

The BDU performs pre-charging by controlling current flow from the battery pack to other components of the vehicle (e.g., inverter connected to an electric motor, accessories) to protect the components from current surges. Current surges may occur when the components are first activated (e.g., when the vehicle is turned on). The BDU performs terminal interfacing by including a terminal that satisfies the requirements of a particular vehicle application related to, for example, terminal type, terminal size, and/or whether the terminal is touch-proof. The BDU performs current sensing by measuring current flow through high current paths between the battery pack and the electrical system.

In order to perform the functions discussed above, the BDU is typically designed for a specific vehicle application. Thus, if the requirements for the functions change, then the BDU must be redesigned to be compatible with the new requirements. In addition, the BDU may not be used for other vehicle applications that have different requirements for the functions. Thus, a new BDU may be designed to satisfy the requirements of each new vehicle application.

A modular BDU according to the principles of the present disclosure includes only the basic components required to perform the core functions of the BDU. The core functions may include controlling current flow between the battery pack and the electrical system. The core functions may also include current sensing. The remainder of the functions discussed above, such as fusing, external charging, pre-charging, and/or terminal interfacing, as well as current sensing may be performed by separate components such as cartridges. The cartridges may connect to the modular BDU through a standard interface such as screw terminals, quick-disconnect terminals, or a combination thereof.

Since the modular BDU includes only the basic components that perform the core functions, the design, construction, and wiring of the modular BDU may be simpler than traditional BDUs. In addition, it may be unnecessary to redesign the modular BDU if the requirements for other functions change. Furthermore, a single modular BDU may be used for multiple vehicle applications without redesigning the modular BDU. In either case, instead of redesigning the modular BDU, cartridges may be designed to satisfy the requirements for the other functions. Designing the cartridges to satisfy the requirements instead of redesigning the modular BDU to satisfy the requirements may reduce engineering and manufacturing costs.

Referring to FIG. 1, a modular BDU 10 includes a positive switch 12, a negative switch 14, a high voltage (HV) connector 16, and a low voltage (LV) connector 18. The positive switch 12 opens and closes a current path 20 between a positive terminal 22 on a battery side of the BDU 10 and a positive terminal 24 on a vehicle side of the BDU 10. The negative switch 14 opens and closes a current path 26 between a negative terminal 28 on the battery side of the BDU 10 and a negative terminal 30 on the vehicle side of the BDU 10. The terminals 22, 28 on the battery side of the BDU 10 are configured to be connected to a battery pack. The terminals 24, 30 on the vehicle side of the BDU 10 are configured to be connected to an electrical system of a vehicle.

A high voltage (HV) wiring harness 32 connects the HV connector 16 to four points on the current paths 20, 26 that correspond to the positive and negative potentials on the battery and vehicle sides of the BDU 10 (B+, B−, V+, V−). The HV connector 16 is configured to be connected to a battery control unit (BCU). The current paths 20, 26 may include bus bars, and the four points to which the wiring harness 32 is connected to may be located on the bus bars. The positive and negative potentials on the battery and vehicle sides of the BDU 10 may be connected to a component within the BCU having high impedance. The BCU may then analyze the voltage across the component to determine the voltage levels the battery and vehicle sides of the BDU 10.

A low voltage (LV) wiring harness 33 connects the LV connector 18 to the positive switch 12 and the negative switch 14. The LV connector 18 is configured to be connected to the BCU. The BCU may send signals through the LV connector 18 to control the positive switch 12 and the negative switch 14. The BCU may control the positive switch 12 and the negative switch 14 based on the voltage measured by a sensor.

In various implementations, the BDU 10 includes pre-charge circuitry such as transistors, semi-conductors, and other control components. The pre-charge circuitry adjusts levels of voltage and/or current levels supplied to components so that the components are partially on or off instead of completely on or completely off. Thus, the pre-charge circuitry may perform a function that is different from the pre-charge function discussed above. As discussed above, the pre-charge function includes controlling current flow from the battery pack to other components to protect the components from current surges.

A cartridge for fusing, external charging, pre-charging, terminal interfacing, and/or current sensing may interface with the BDU 10 through one or both of the terminals 22, 28 on the battery side of the BDU 10. Alternatively, the cartridge may interface with the BDU 10 through one or both of the terminals 24, on the vehicle side of the BDU 10. The terminals 22, 28, 24, 30 may be screw terminals, quick-disconnect terminals, or a combination of one or more screw terminals and one or more quick-disconnect terminals.

The cartridge may include one or more terminals that serve as a new connection point for those of the terminals 22, 28, 24, 30 through which the cartridge is connected to the BDU 10. When the cartridge is connected to the BDU 10, the cartridge may be completely isolated from the BDU 10 except for the interface between the cartridge and the BDU 10. In addition, the cartridge may cover the interface between the cartridge and the BDU 10 to prevent contact with the interface one the cartridge is installed. The cartridge may include connectors and/or bus bars, which may be used to communicate with the BCU.

Figure 2:
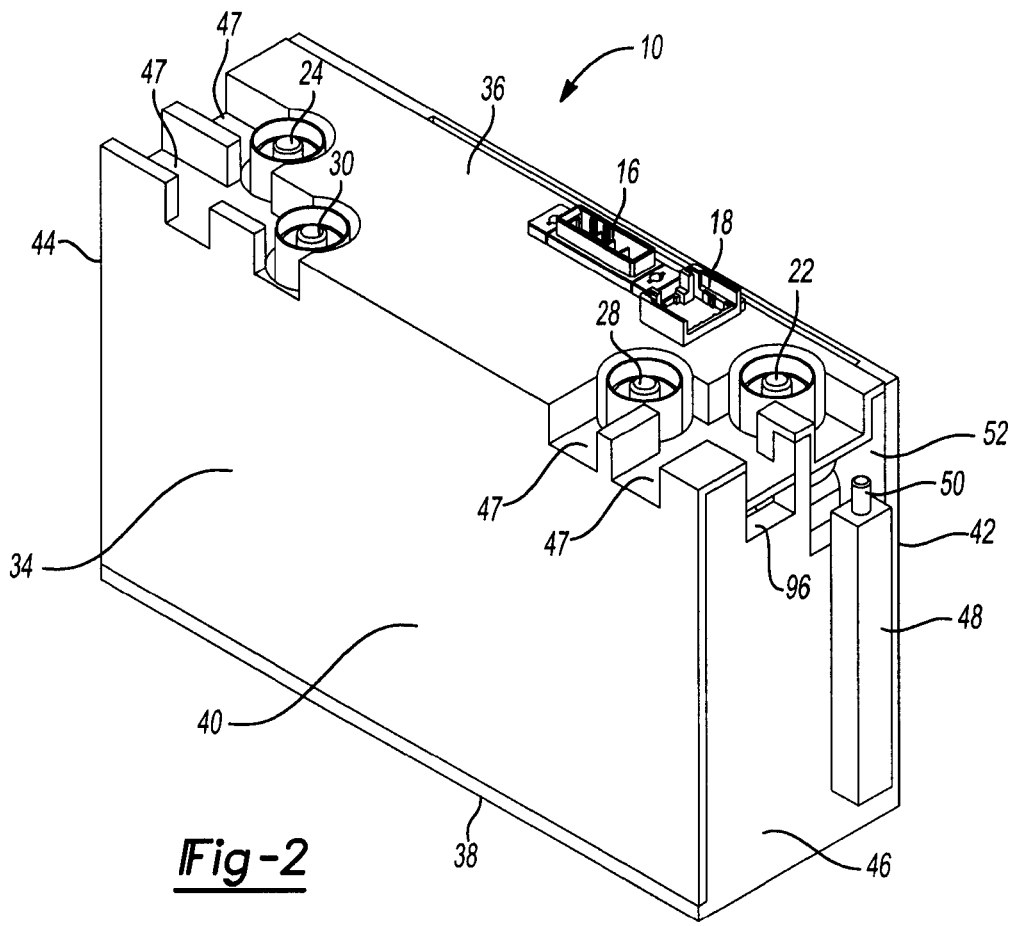
FIG. 2 is a perspective view of the first modular BDU.

Referring to FIG. 2, the BDU 10 includes a housing 34 that isolates the components of the BDU 10 containing within the housing 34. The housing 34 includes a top 36, a bottom 38, side walls 40, 42, and end walls 44, 46. The top 36, the bottom 38, the side walls 40, 42, and the end walls 44, 46 cooperate to form a rectangular cuboid.

The terminals 22, 28, 24, 30 are depicted as screw connections that extend through the housing 34. The housing 34 includes slots 47 for receiving wires that connect to the terminals 22, 28 and for receiving wires that connect to the terminals 24, 30. The terminals 22, 28 are adjacent to the end wall 44 with corresponding ones of the slots 47 extending to the end wall 44. The terminals 24, 30 are adjacent to the end wall 46 with corresponding ones of the slots 47 extending to the side wall 40. The terminals 22, 28, 24, 30 and the slots 47 may be positioned and/or oriented in ways other than the way shown.

The housing 34 also includes a slide member 48 and a terminal 50. The slide member 48 forms a rectangular cuboid that extends outward from the end wall 46 of the housing 34. The terminal 50 is configured to connect to a terminal on a cartridge such as a quick-disconnect terminal. The terminal 50 may be connected to the positive terminal 22 using, for example, a bus bar that extends between the terminals 22, 50 through an opening 52 in the end wall 46. As the cartridge is installed, the cartridge may be slid onto the BDU by engaging a channel or slot on the cartridge with the slide member 48. In turn, the slide member 48 may serve as a rail or track that guides the cartridge and positions the cartridge for connecting the cartridge terminal to the terminal 50.

Referring to FIG. 3, a fuse cartridge 54 is shown connected to the positive terminal 22 on the battery side of the BDU 10. The fuse cartridge 54 includes terminals 56, 57, a current path 58 between the terminals 56, 57, and a main fuse 60 disposed in the current path 58. The terminals 56, 57 may be quick-disconnect terminals. The main fuse 60 may be a high voltage fuse that protects the battery pack and the electrical system when a short circuit occurs.

When a short circuit occurs, a single current path with little to no resistance connects the positive and negative potential. This results in a high value of current due to a lack of resistance in the current path other than material resistance. Current may be determined using the following equation:

$$\text{Current} = \frac{\text{Voltage}}{\text{Resistance}} \qquad (1)$$

A short circuit may be a major fault for a battery pack due to the power requirements that a battery pack must satisfy. The voltage supplied by a battery pack can range from 150 volts (V) to 500 V. When a short circuit occurs, this voltage is applied to a current path having a resistance that is less than one ohm, usually less than 1 ohm by an order of magnitude of tens or hundreds. As a result, the amount of current that flows through the current path is very high.

The main fuse 60 may be designed to pass a certain level of current for a certain amount of time. The level of current that the main fuse 60 will pass and the amount of time for which the main fuse 60 will pass the current level may depend on its fuse type and fuse rating. The main fuse 60 may have a continuous rating corresponding to a certain level of current below which the main fuse 60 will pass current for an unlimited amount of time.

Current-time graphs may show a current level that the main fuse 60 can pass and a corresponding period before the main fuse 60 fails. The current level and the corresponding period may be dictated by the material from which the current path 58 is composed. The main fuse 60 may be selected to ensure that the main fuse 60 fails before any component in the battery pack fails.

Referring to FIGS. 4 and 5, the fuse cartridge 54 also includes a housing 62 having a top 66, a bottom 68, side walls 70, 72, and an end wall 74. The bottom defines a slide path 76 configured to receive the slide member 48 on the housing 34 of the BDU 10. The side wall 70 includes a lip 78 that overlaps the side wall 40 of the housing 34 when the fuse cartridge 54 is installed.

To install the fuse cartridge 54, the slide path 76 on the fuse cartridge 54 is aligned with the slide member 48 on the BDU 10, and the lip 78 on the fuse cartridge 54 is positioned alongside the side wall 40 of the BDU 10, as shown in FIG. 4. The fuse cartridge 54 is then slid downward along the slide member 48 until the fuse cartridge 54 is positioned as shown in FIG. 5. This connects the terminal 57 on the fuse cartridge 54 and the terminal 50 on the BDU 10.

The top 66 of the fuse cartridge 54 includes a lip 80 that covers the connection between the terminals 50, 57 when the fuse cartridge 54 is installed. Additionally or alternatively, a separate cover may be attached to the housing 34 of the BDU 10 and/or to the housing 62 of the fuse cartridge 54. The separate cover may cover the connection between the terminals 50, 57 and/or the connection between the terminals 22, 50.

Figure 7:
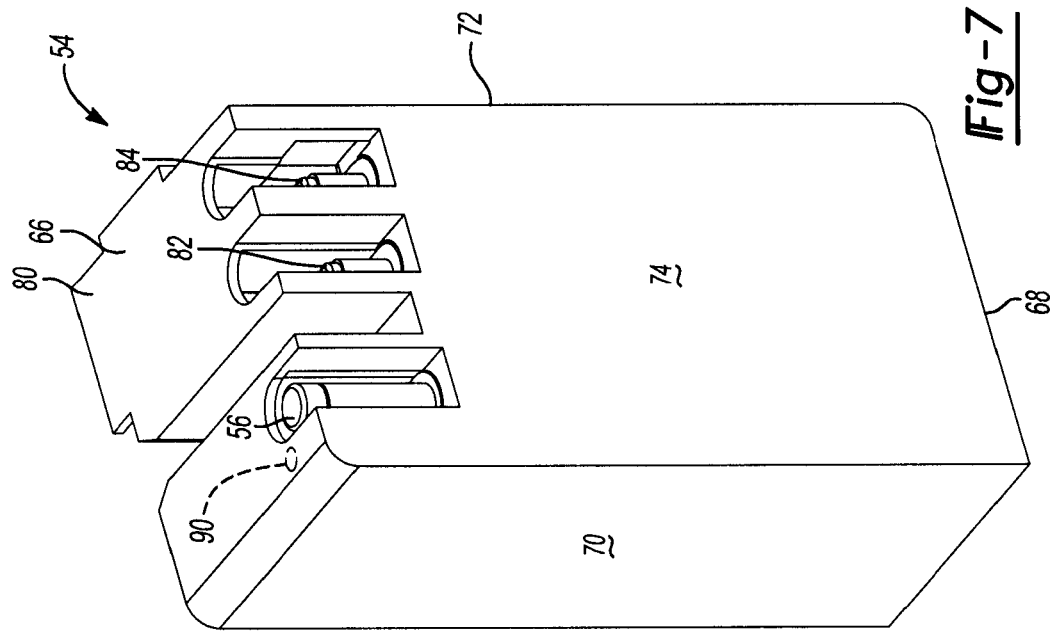
FIGS. 6 and 7 are enlarged perspective views of the fuse cartridge.
Figure 6:
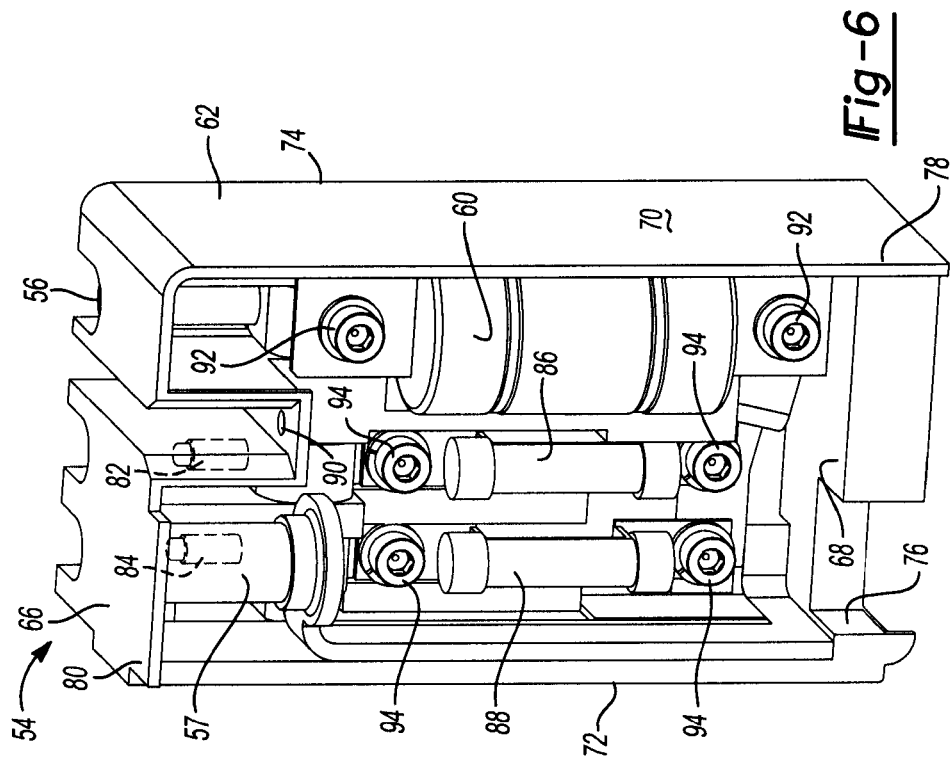

Referring to FIGS. 6 and 7, the fuse cartridge 54 also includes auxiliary terminals 82, 84, auxiliary fuses 86, 88, and a fastener hole 90. The auxiliary terminals 82, 84 may be screw terminals or quick-disconnect terminals. The auxiliary fuses 86, 88 may be disposed in current paths between the auxiliary terminals 82, 84, respectively, and the terminal 57. The auxiliary fuses 86, 88 may be used for external lines that require fusing. The external lines may be for external/onboard charging, heater control, or other auxiliary power requirements. Fasteners 92, 94 may secure the fuses 60, 86, 88 within the housing 62 of the fuse cartridge 54.

The main fuse 60 and the auxiliary fuses 86, 88 may have a rating that satisfies their respective power requirements. In one example, the main fuse 60 may have a short-term rating of 7500 amperes (A) and a long-term rating of 450 A. In another example, the auxiliary fuses 86, 88 may have only a short-term rating such as 40 A for onboard charging or 60 A for external charging. A short-term rating may correspond to a period of one second or less, while a long-term rating may correspond to a period of 30 seconds or more.

The fastener hole 90 may be threaded and may be used to fasten the fuse cartridge 54 to the housing 34 of the BDU 10. For example, the housing 34 of the BDU 10 may include a hole that aligns with the fastener hole 90 when the fuse cartridge 54 is installed, and screw may be inserted into the two holes. Alternatively, with brief additional reference to FIG. 2, a bracket may be secured within the housing 34 and extend through an opening 96 in the end wall 46 of the housing 34. The bracket may include a hole that aligns with the fastener hole 90, and a screw may be inserted into the two holes.

To replace the fuses 60, 86, 88, a technician may slide the fuse cartridge 54 upward from the position shown in FIG. 5 to the position shown in FIG. 4. The technician may continue to slide the fuse cartridge upward until the fuse cartridge 54 is completely disassembled from the BDU 10. This disconnects the terminal 57 on the fuse cartridge 54 from the terminal 50 on the BDU 10, allowing the technician to safely replace the fuses 60, 86, 88. Replacing a fuse in this way requires less time and labor relative to disassembling a BDU from a battery pack and removing a cover on the BDU to replace a fuse within the BDU.

Figure 8:
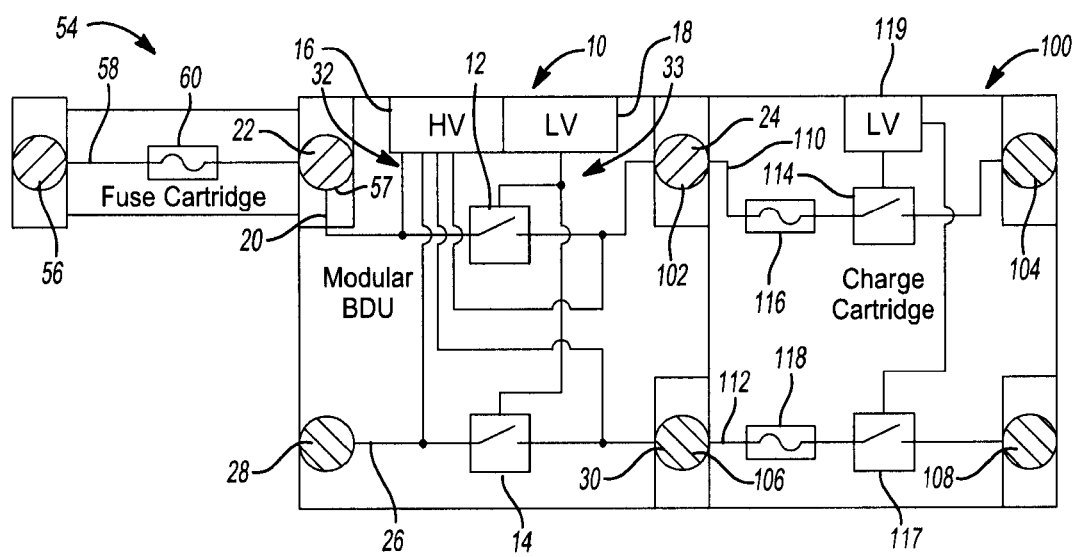
FIG. 8 is a schematic diagram of the fuse cartridge and a first charge cartridge according to the principles of the present disclosure connected to the first modular BDU.

Referring to FIG. 8, a charge cartridge 100 is shown connected to the BDU 10 on the vehicle side of the BDU 10. The charge cartridge 100 includes positive terminals 102, 104, negative terminals 106, 108, a current path 110 between the positive terminals 102, 104, and a current path 112 between the negative terminals 106, 108. The charge cartridge 100 also includes a switch 114 and a fuse 116 disposed in the current path 110, a switch 117 and a fuse 118 disposed in the current path 112, and a LV connector 119 connected to the switches 114, 117. In various implementations, the fuse 118 in the current path 112 may be omitted.

External charging is an important feature which a battery pack and a BDU must be designed to support, especially in electric vehicles and plug-in hybrid electric vehicles. Some applications may require additional control switches for the charging paths and a protection fuse. Traditionally, if a BDU does not include these features, the packaging and control lines of the BDU are altered to include the features. In contrast, these features may be added to the BDU 10 by simply installing the charge cartridge 100, eliminating the need to modify the BDU 10 to include these features.

The terminals 102, 104, 106, 108 may be screw terminals or quick-disconnect terminals. The switch 114 opens and closes the current path 110. The switch 117 opens and closes the current path 112. A BCU may control the switches 114, 117 by sending voltage signals to the switches 114, 117 through the LV connector 119. Thus, instead of the BDU 10 interfacing with the BCU, the BDU 10 may simply interface with the charge cartridge 100 and the BCU may access the switches 114, 117 directly through the LV connector 119. The fuses 116, 118 may have a rating that satisfies the power requirements of external charging. In one example, the fuses 116, 118 may have a short-term rating such as 40 A.

Figure 9:
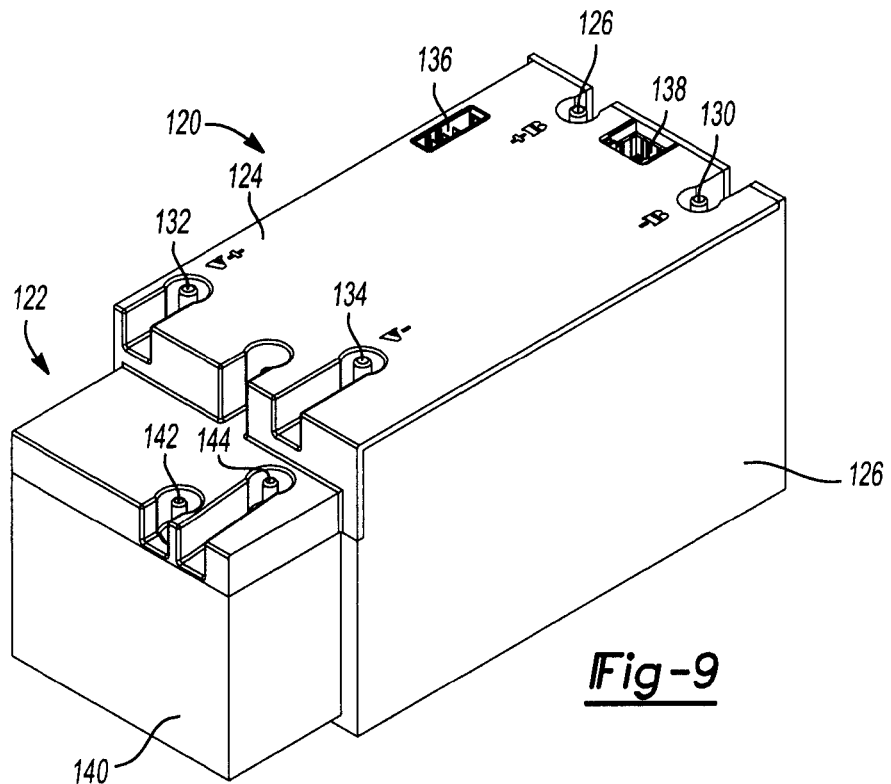
FIGS. 9 and 10 are perspective views of a second modular BDU, a second charge cartridge, and a cover for the second modular BDU and the second charge cartridge according to the principles of the present disclosure.
Figure 10:
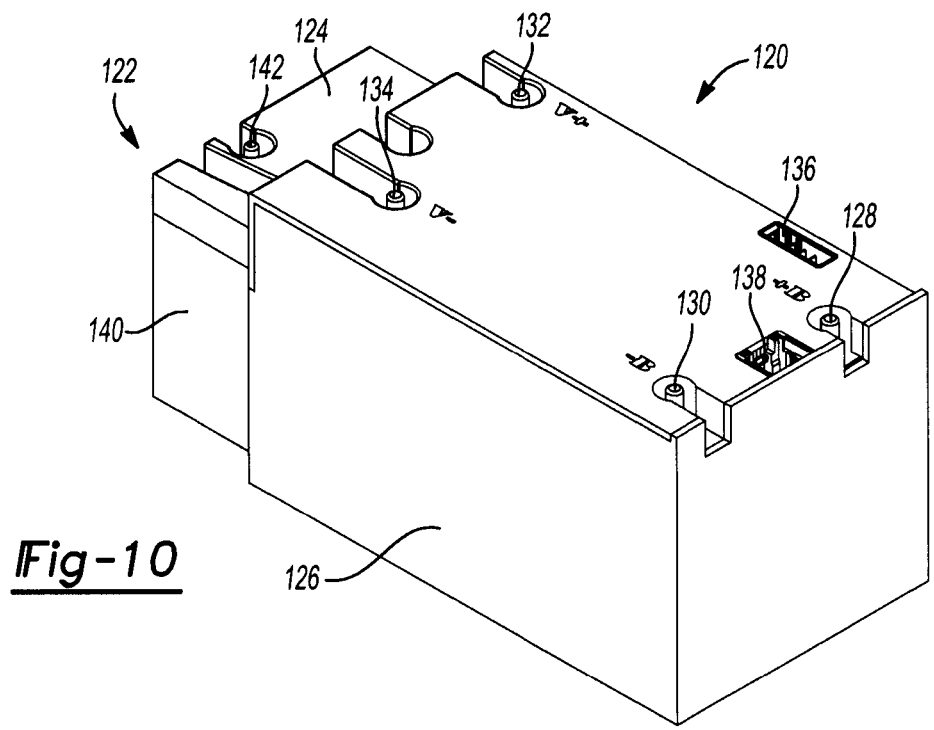

Referring to FIGS. 9 and 10, a modular BDU 120 is shown with a charge cartridge 122 connected to the BDU 120 and a cover 124 covering components disposed within both the BDU 120 and the charge cartridge 122. The BDU 120 includes a housing 126, positive and negative terminals 128, 130 on a battery side of the BDU 120, positive and negative terminals 132, 134 on a vehicle side of the BDU 120, a HV connector 136, and a LV connector 138.

The charge cartridge 122 includes a housing 140 and terminals 142, 144. The terminals 128, 130, 132, 134, 142, 144 and the connectors 136, 138 extend through the cover 124. The terminals 128, 130, 132, 134, 142, 144 may be screw terminals, as shown, or quick-disconnect terminals. When the charge cartridge 122 is connected to the BDU 120, as shown, the terminals 142, 144 on the BDU 120 are connected to the positive and negative terminals 132, 134 on the vehicle side of the BDU 120. Thus, the terminals 142, 144 replace the terminals 132, 134 as the interface between the BDU 120 and external charging components (e.g., a plug-in for connecting to an outside power source).

Figure 11:
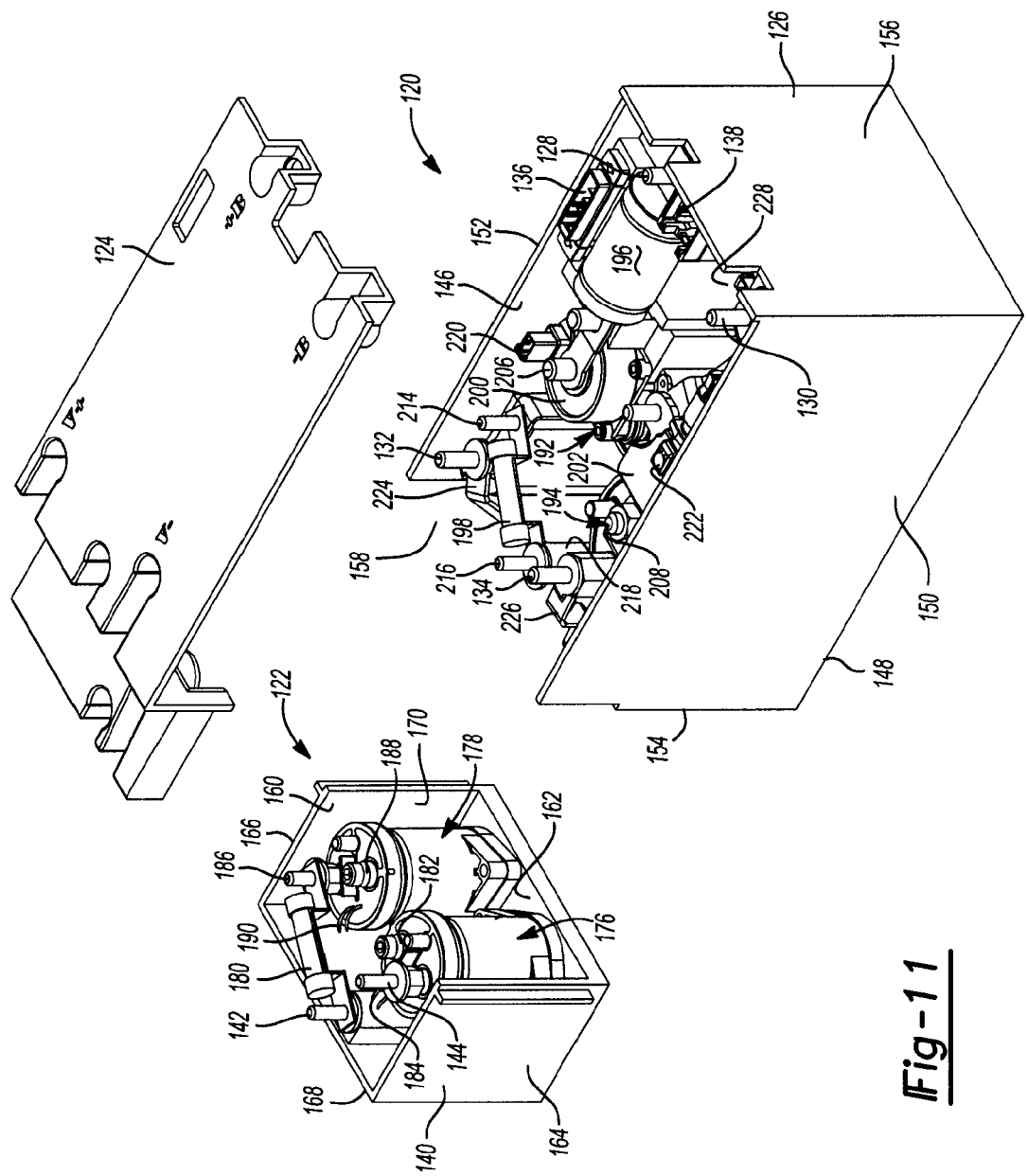
FIG. 11 is a disassembled perspective view of the second modular BDU, the second charge cartridge, and the cover.

Referring to FIG. 11, the housing 126 of the BDU 120 includes an open top 146, a closed bottom 148, side walls 150, 152, and end walls 154, 156. The end wall 154 defines an opening 158. The housing 140 of the charge cartridge 122 includes an open top 160, a closed bottom 162, side walls 164, 166, an end wall 168, and an opening 170 opposite the end wall 168. The openings 158, 170 in the housings 126, 140 provide access for connections between terminals or connectors within the BDU 120 and terminals or connectors within the charge cartridge 122.

Figure 12:
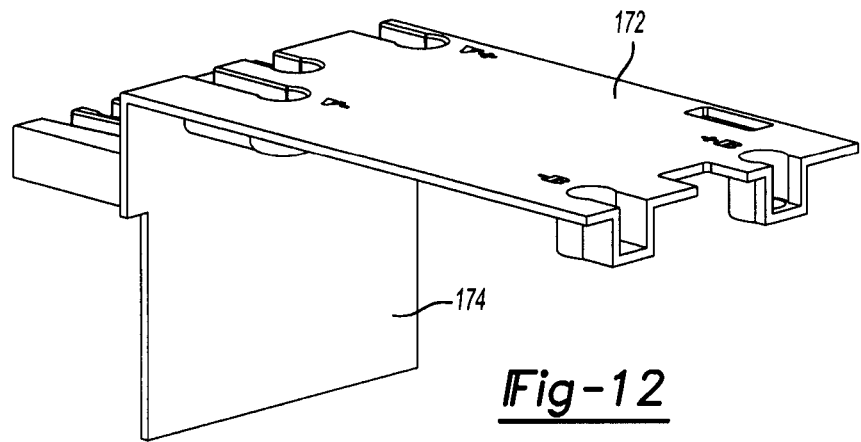
FIG. 12 is a perspective view of a cover for the second modular BDU by itself according to the principles of the present disclosure.

With additional reference to FIG. 12, when the charge cartridge 122 is not attached to the BDU 120, a cover 172 may be used in place of the cover 124 to cover the interior of the BDU 120. The cover 172 includes an end wall 174 that covers the opening 158 in the housing 126 of the BDU 120 when the cover 172 is installed. When the cover 172 is installed, the terminals 128, 130, 132, 134 on the BDU 120 extend through the cover 172. The cover 172 may be secured to the BDU 120 using, for example, nuts that thread onto posts forming the terminals 128, 130, 132, 134 on the BDU 120.

Figure 13:
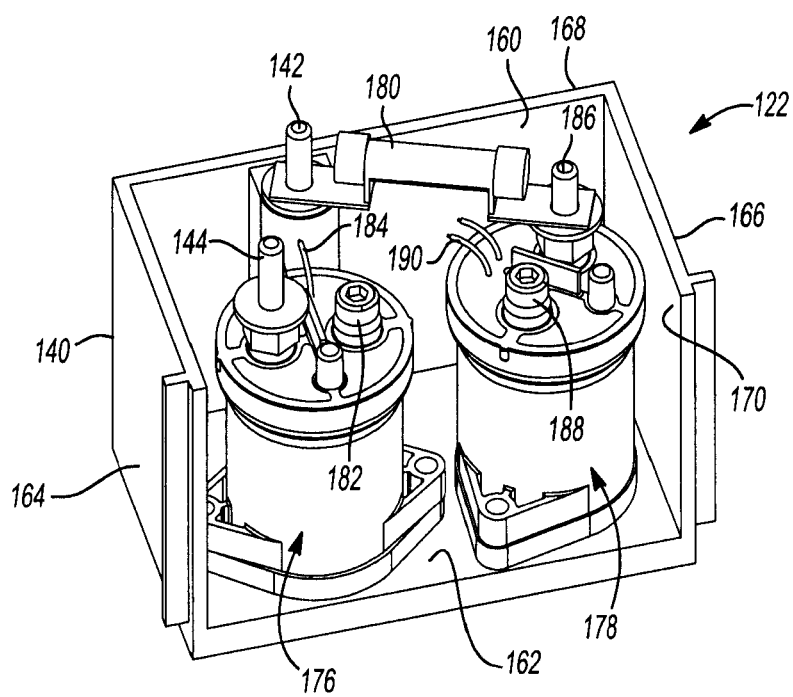
FIG. 13 is an enlarged perspective view of the second charge cartridge.

Referring to FIG. 13, the charge cartridge 122 also includes switches 176, 178 and a fuse 180. The switch 176 includes the terminal 144, which extends through the cover 124, a terminal 182, which does not extend through the cover 124, and a coil connector 184. The switch 178 includes terminals 186, 188, which do not extend through the cover 124, and a coil connector 190. The coil connectors 184, 190 may be connected to the BCU, which may send signals therethrough to control the switches 176, 178.

Figure 14:
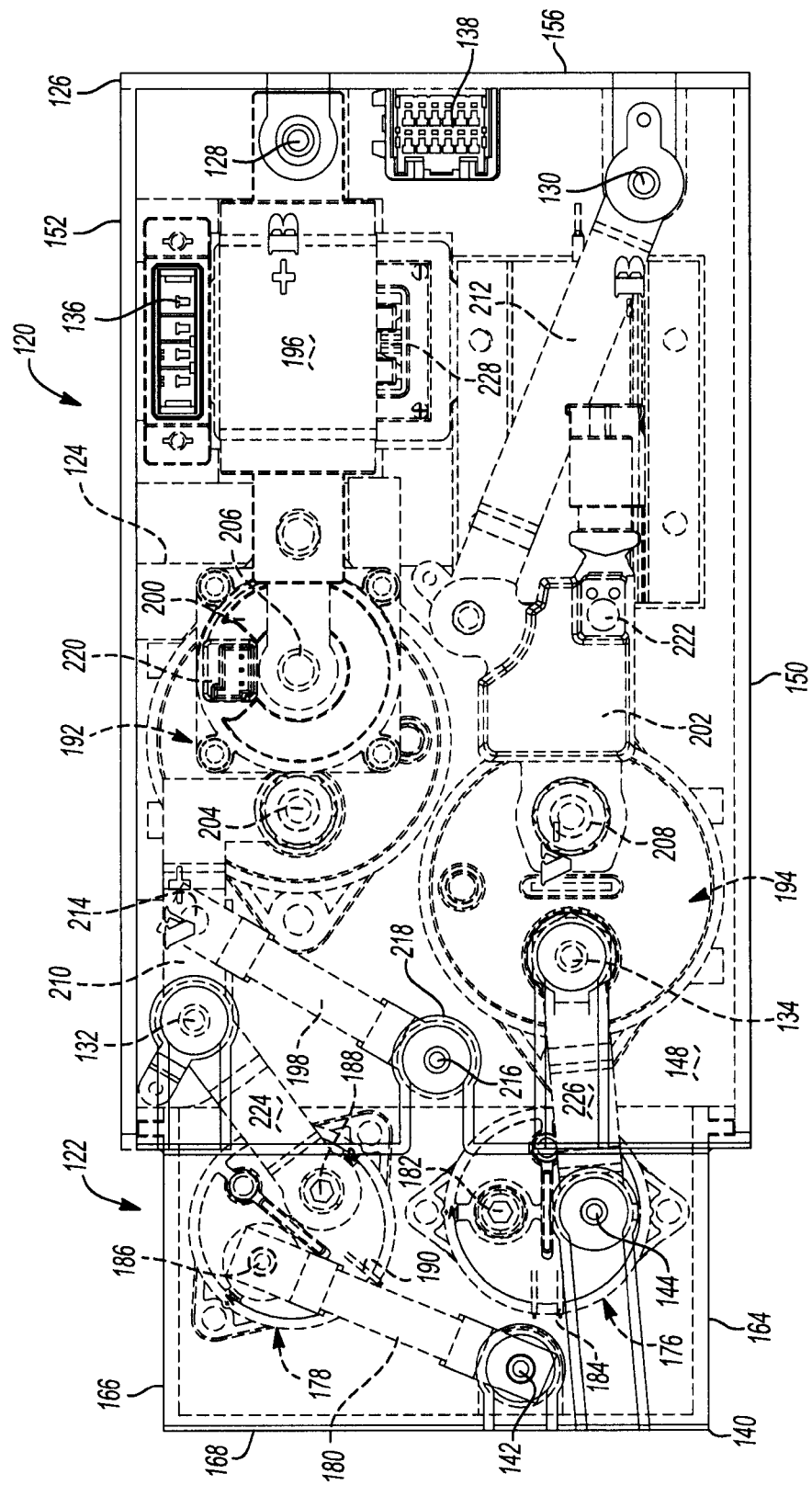
FIG. 14 is a top view of the second modular BDU, the second charge cartridge, and the cover of FIG. 11, with the cover shown in phantom.

Referring again to FIG. 11, with additional reference to FIG. 14, the BDU 120 also includes switches 192, 194, a main fuse 196, an auxiliary fuse 198, a Hall effect sensor 200, and a shunt sensor 202. The switch 192 includes a terminal 204, which does not extend through the cover 124, and a terminal 206, which extends through the Hall effect sensor 200 but does not extend through the cover 124. The switch 194 includes the terminal 134, which extends through the cover 124, and a terminal 208, which does not extend through the cover 124.

The main fuse 196 and the auxiliary fuses 198 may have ratings that satisfy their respective power requirements. The main fuse 196 may satisfy the maximum power requirements of the battery pack, while the auxiliary fuse may satisfy the power requirements of onboard charging. In one example, the main fuse 196 may have a short-term rating of 7500 A and a long-term rating of 450 A, and the auxiliary fuses 198 may have only a short-term rating of 40 A.

The switch 192, the main fuse 196, and the Hall effect sensor 200, are disposed in a first current path between the positive terminal 128 on the battery side of the BDU 120 and the positive terminal 132 on the vehicle side of the BDU 120. The first current path includes a bus bar 210 that connects the terminal 204 on the switch 192 and the positive terminal 132.

The switch 194 and the shunt sensor 202 are disposed in a second current path between the negative terminal 130 on the battery side of the BDU 120 and the negative terminal 134 on the vehicle side of the BDU 120. The second current path includes a bus bar 212 that connects the negative terminal 130 and a terminal 214 on the shunt sensor 202.

The auxiliary fuse 198 is disposed in a third current path between the terminal 214 on the bus bar 210 and a terminal 216 that extends through the cover 124. The housing 126 of the BDU 120 includes a support 218 that extends from the bottom 148 of the housing 126 and supports the terminal 216. The terminal 216 and the negative terminal 134 on the vehicle side of the BDU 120 may be connected to onboard charging components (e.g., an alternator).

The Hall effect sensor 200 measures the level of current flowing through the first current path and outputs the current level to the BCU. The shunt sensor 202 measures the level of current flowing through the second current path and outputs the current level to the BCU. The sensors 200, 202 may output a voltage signal or a hexadecimal signal, such as a CAN, SENT, or LIN signal, indicating the current level. The sensors 200, 202 respectively include connectors 220, 222, which may be connected to the BCU using, for example, a wiring harness.

A bus bar 224 connects the positive terminal 132 on the vehicle side of the BDU 120 and the terminal 188 on the switch 178 in the charge cartridge 122. A bus bar 226 connects the negative terminal 134 on the vehicle side of the BDU 120 and the terminal 144 on the switch 176 in the charge cartridge 122. The bus bars 224, 226 extend through the openings 158, 170 in the housings 126, 140 of the BDU 120 and the charge cartridge 122.

The BDU 120 may also include a pre-charge relay 228. Alternatively, the pre-charge relay 228 and/or other components of the BDU 120, such as the auxiliary fuse 198, the Hall effect sensor 200, and the shunt sensor 202, may be moved to a cartridge to improve the versatility of the BDU 120. Thus far, a fuse cartridge and a charge cartridge have been described. Other cartridges may perform pre-charging, current sensing, or terminal interfacing. For ease of discussion, such cartridges will now be described with reference to the BDU 10.

Referring to FIG. 15, a pre-charge cartridge 230 is shown connected to the positive terminal 24 on the vehicle side of the BDU 10. The pre-charge cartridge 230 includes terminals 232, 234, a current path 236 between the terminals 232, 234, a switch 238 disposed in the current path 236, and a resistor 240 disposed in the current path 236. The terminals 232, 234 may be screw terminals or quick-disconnect terminals.

The switch 238 may include connectors for communication with a BCU. The BCU may send control signals to the switch 238 during pre-charging to open or close the current path 236. The BCU may send control signals to the switch 238 using, for example, a standalone harness disposed within the pre-charge cartridge 230. The current path 236 is in parallel with the current path 20 between the positive terminal 22 on the battery side of the BDU 10 and the positive terminal 24 on the vehicle side of the BDU 10.

When components of a vehicle are first activated, such as when an ignition is switched on, the negative switch 14 may be closed first and then the positive switch 12 may be closed. To activate pre-charging, the switch 238 may be closed after the negative switch 14 is closed and before the positive switch 12 is closed. Thus, current is allowed to flow to a capacitive load of a vehicle during pre-charging, but the current flows through the current path 236 instead of the current path 20.

In various implementations, the current path 236 may be in parallel with the current path 26 between the negative terminal 28 on the battery side of the BDU 10 and the negative terminal 30 on the vehicle side of the BDU 10. For example, in some cases, when components of a vehicle are first activated, the positive switch 12 may be closed first and then the negative switch 14 may be closed. In these cases, if the current path 246 is in parallel with the current path 26, the switch 238 may be closed after the positive switch 12 is closed and before the negative switch 14 is closed to activate pre-charging.

The resistance of the resistor 240 controls the amount of current that is allowed to flow to the load. The amount of current that is allowed to flow to the loads is inversely proportional to the resistance of the resistor 240. In this example, the resistor 240 is a fixed resistor having a fixed resistance. However, the resistor 240 may be a variable resistor having a resistance that is controlled by the BCU. The resistor 240 may be selected from various types of resistors depending on power dissipation and thermal requirements. The resistor 240 may include a housing made from aluminum, ceramic, and/or cement.

Pre-charging is activated for a period that may be referred to as a time constant. A capacitive load may require between three and five time constants of pre-charging to become charged. The time constant is directly proportional to the resistance of the resistor 240 and the capacitance of the load. The resistor 240 may be sized based on a desired pre-charge period.

Referring to FIG. 16, a terminal interface cartridge 242 is shown. The interface cartridge 242 includes terminals 244, 246 connected to the positive and negative terminals 24, 30 on the vehicle side of the BDU 10, and terminals 248, 250 that are connected to the terminals 244, 246 using, for example, bus bars. The terminals 244, 246 may be a first type of terminals and the terminals 248, 250 may be a second type of terminals that is different from the first type.

The first type may be a standard terminal type used for all connections between the BDU 10 and cartridges that connect to the BDU 10. The second type may depend on the power requirements of a vehicle application and/or safety standards that a vehicle application must satisfy. In one example, the terminals 244, 246 may have a standard interface, such as screw terminals, and the terminals 248, 250 may be quick-disconnect terminals, flying leads, connectors, and/or interfaces having various sizes.

In another example, a vehicle application may require a touch-proof interface. In some cases, it may be necessary to redesign a BDU, for example, by changing a bus bar and/or a housing, to satisfy such a requirement. In contrast, the interface cartridge 242 may be designed to satisfy such a requirement without redesigning the BDU 10.

Referring to FIG. 17, a current sensing cartridge 252 is shown. The sensing cartridge 252 includes a terminal 254 connected to the positive terminal 24 on the vehicle side of the BDU 10, a terminal 256, a current path 258 connecting the terminals 254, 256, and a sensor 260 disposed in the current path 258. Although shown connected to the positive terminal 24, the terminal 254 may be connected to the negative terminal 30 on the vehicle side of the BDU 10 or to the positive or negative terminals 22, 28 on the battery side of the BDU 10.

The sensor 260 measures current flowing through the current path 258. The sensor 260 may be a Hall effect sensor, a shunt sensor, or a dual range sensor. The sensor 260 may be selected based on range, accuracy, and redundancy requirements. Some vehicle applications requirement multiple current sensors for safety and control reasons. Thus, the sensing cartridge 252 may include a single Hall effect sensor, a single shunt sensor, a single dual range sensor, or two, three, or more of these types of sensors.

Various features of the different cartridges described above may be integrated into a single cartridge. For example, a single cartridge may include a component such as the fuse 60 that enables the cartridge to perform fusing and a component such as the sensor 260 that enables the cartridge to perform current sensing. In addition, the cartridge may be connected to different terminals of the BDUs relative to the terminal connections described above.

As used herein, the term switch may refer to an electromechanical switch, a relay, a contactor, a solenoid, a semiconductor, or a combination of one or more of these components.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
a battery disconnect unit (BDU) that includes a first positive terminal, a first negative terminal, a second positive terminal, a second negative terminal, a first current path between the first positive terminal and the second positive terminal, a second current path between the first negative terminal and the second negative terminal, a first switch disposed in the first current path, a second switch disposed in the second current path, and a BDU housing including a slide member; and
a first cartridge that includes a first terminal, a second terminal, a current path between the first terminal and the second terminal and a cartridge housing including a slide path corresponding to the slide member,
wherein the first terminal is configured to connect to one of the terminals on the BDU, and
wherein the slide member and the slide path are configured such that the slide path engages the slide member so as to guide the first cartridge to connect the first terminal to the one of the terminals on the BDU.

2. The system of claim 1 wherein the second switch is different from the first switch.

3. The system of claim 1 wherein the BDU housing is configured to isolate components disposed within the BDU when the first cartridge is detached from the BDU.

4. The system of claim 1 wherein the BDU includes a first connector that is connected to the switch and that is configured to be connected to a battery control unit (BCU).

5. The system of claim 4 wherein the BDU includes a second connector that is configured to be connected to the BCU and a wiring harness that connects the second connector to the first current path on both sides of the first switch and to the second current path on both sides of the second switch.

6. The system of claim 1 wherein the first terminal on the first cartridge and the one of the terminals on the BDU to which the first terminal is connected are quick-disconnect terminals.

7. The system of claim 1, wherein the cartridge housing is configured to isolate the connection between the first terminal on the first cartridge and the one of the terminals on the BDU when the first cartridge is installed onto the BDU.

8. The system of claim 1 wherein the first cartridge includes a fuse disposed in the current path between the first terminal and the second terminal.

9. The system of claim 1 wherein the first terminal on the first cartridge and the second terminal on the first cartridge are different types of terminals.

10. The system of claim 1 wherein the cartridge includes a current sensor that measures current in the current path between the first terminal and the second terminal.

11. The system of claim 1 further comprising a second cartridge including a third terminal configured to connect to at least one of the terminals on the BDU, a fourth terminal, and a second current path between the third terminal and the fourth terminal.

12. The system of claim 11 wherein:
the first terminal on the first cartridge is configured to connect to the first positive terminal on the BDU, and
the first cartridge includes a fifth terminal configured to connect to the first negative terminal on the BDU, a sixth terminal, and a third current path connecting the fifth terminal and the sixth terminal.

13. The system of claim 12 wherein the second cartridge includes at least one of a switch and a fuse disposed in the second current path between the third terminal and the fourth terminal.

14. The system of claim 1, wherein:
the BDU housing includes a first side wall and an end wall perpendicular to the first side wall, the slide member extending outwardly from the end wall, and
the first cartridge includes a bottom wall defining the slide path and a second side wall perpendicular to the bottom wall, the second side wall including a lip configured to overlap the first side wall.

15. The system of claim 1, wherein:
the slide member includes a first longitudinal end, and the one of the terminals on the BDU extends from the first longitudinal end, and the first cartridge includes an upper wall opposite the bottom wall, and the first terminal extends from the upper surface towards the bottom surface so as to contact the one of the terminals on the BDU in an installed state.

16. A system comprising:
a battery disconnect unit (BDU) that includes a first positive terminal, a first negative terminal, a second positive terminal, and a second negative terminal, a first current path between the first positive terminal and the second positive terminal, a second current path between the first negative terminal and the second negative terminal, a first switch disposed in the first current path, and a second switch disposed in the second current path; and
a cartridge that includes a third positive terminal, a third negative terminal, a fourth positive terminal, a fourth negative terminal, a third current path between the third positive terminal and the fourth positive terminal, and a fourth current path between the third negative terminal and the fourth negative terminal,
wherein the third positive terminal is configured to connect to the first positive terminal on the BDU and the third negative terminal is configured to connect to the first negative terminal on the BDU, and
wherein the cartridge includes a third switch disposed in the third current path and a fourth switch disposed in the fourth current path.

17. The system of claim 16 wherein the cartridge includes a first fuse disposed in the third current path and a second fuse disposed in the fourth current path.

18. A system comprising:
a battery disconnect unit (BDU) that includes a first positive terminal, a first negative terminal, a second positive terminal, and a second negative terminal, a first current path between the first positive terminal and the second positive terminal, a second current path between the first negative terminal and the second negative terminal, a first switch disposed in the first current path, and a second switch disposed in the second current path; and
a cartridge that includes a first terminal, a second terminal, and a current path between the first terminal and the second terminal, wherein the first terminal is configured to be connected to one of the first positive terminal and the first negative terminal, and the second terminal is configured to be connected to one of the second positive terminal and the second negative terminal.

19. The system of claim 18 wherein the cartridge includes a switch and a resistor disposed in the current path between the first terminal and the second terminal.

20. The system of claim 19 wherein the resistor is sized based on a desired period for charging capacitive loads connected to the one of the first positive terminal and the first negative terminal.

* * * * *